United States Patent
Guy et al.

(10) Patent No.: US 11,629,080 B2
(45) Date of Patent: Apr. 18, 2023

(54) FILTERWELL CARTRIDGES

(71) Applicant: King Technology Inc., Hopkins, MN (US)

(72) Inventors: David Guy, Maple Grove, MN (US); Jeffrey D Johnson, Edina, MN (US); Paul Freeberg, South St. Paul, MN (US); Terry Goeman, Minnetonka, MN (US); Lyle Enderson, Maple Grove, MN (US); Darrin Swagel, Minnetonka, MN (US); Eric Barton, Eden, MN (US)

(73) Assignee: KING TECHNOLOGY INC., Minnetonka, MN (US)

( * ) Notice: Subject to any disclaimer, the term of this patent is extended or adjusted under 35 U.S.C. 154(b) by 59 days.

(21) Appl. No.: 16/873,295

(22) Filed: Mar. 11, 2020

(65) Prior Publication Data
US 2020/0216341 A1    Jul. 9, 2020

Related U.S. Application Data

(63) Continuation-in-part of application No. 16/059,977, filed on Aug. 9, 2018, now Pat. No. 10,988,951.

(60) Provisional application No. 62/919,523, filed on Mar. 15, 2019, provisional application No. 62/544,173, filed on Aug. 11, 2017, provisional application No. 62/564,620, filed on Sep. 28, 2017.

(51) Int. Cl.
*C02F 1/68* (2023.01)
*C02F 1/76* (2023.01)
*C02F 103/42* (2006.01)

(52) U.S. Cl.
CPC ............. *C02F 1/688* (2013.01); *C02F 1/76* (2013.01); *C02F 2103/42* (2013.01); *C02F 2201/006* (2013.01)

(58) Field of Classification Search
CPC ...... C02F 1/688; C02F 1/76; C02F 2201/006; C02F 2103/42; C02F 1/68
USPC ........... 210/167.11, 205, 206, 753, 754, 755, 210/756; 422/266
See application file for complete search history.

(56) References Cited

U.S. PATENT DOCUMENTS

| | | | |
|---|---|---|---|
| 2,950,959 A * | 8/1960 | Ve Relle | E03D 9/033 422/263 |
| 3,749,244 A * | 7/1973 | Jannuzzi, Jr. | E04H 4/1209 210/167.11 |
| 4,115,270 A * | 9/1978 | Phillips | B01F 1/0016 137/268 |
| 6,077,484 A * | 6/2000 | Graves | B01F 1/0027 422/255 |
| 6,790,353 B2 * | 9/2004 | Connelly, Jr. | B01F 1/0027 210/167.11 |
| 8,168,065 B1 * | 5/2012 | Gavigan | E04H 4/1272 210/167.11 |
| 2005/0211613 A1 * | 9/2005 | King | C02F 1/688 210/167.11 |
| 2019/0048604 A1 * | 2/2019 | Guy | B01F 1/0027 |

* cited by examiner

*Primary Examiner* — Fred Prince
(74) *Attorney, Agent, or Firm* — Johnson & Phung LLC

(57) ABSTRACT

A filterwell cartridge having ports for dispensing a dispersant directly into a filterwell of a hot tub, spa or the like with the filterwell cartridge peripherally and postionally supportable in a quick release mode through facial engagement of compound surfaces located on opposite sides of the filterwell cartridge.

23 Claims, 8 Drawing Sheets

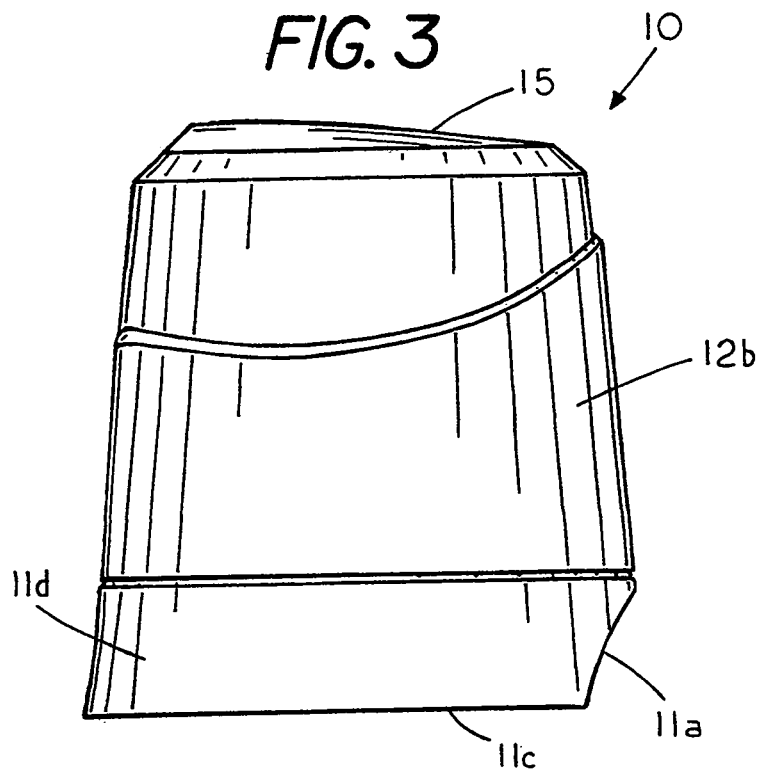
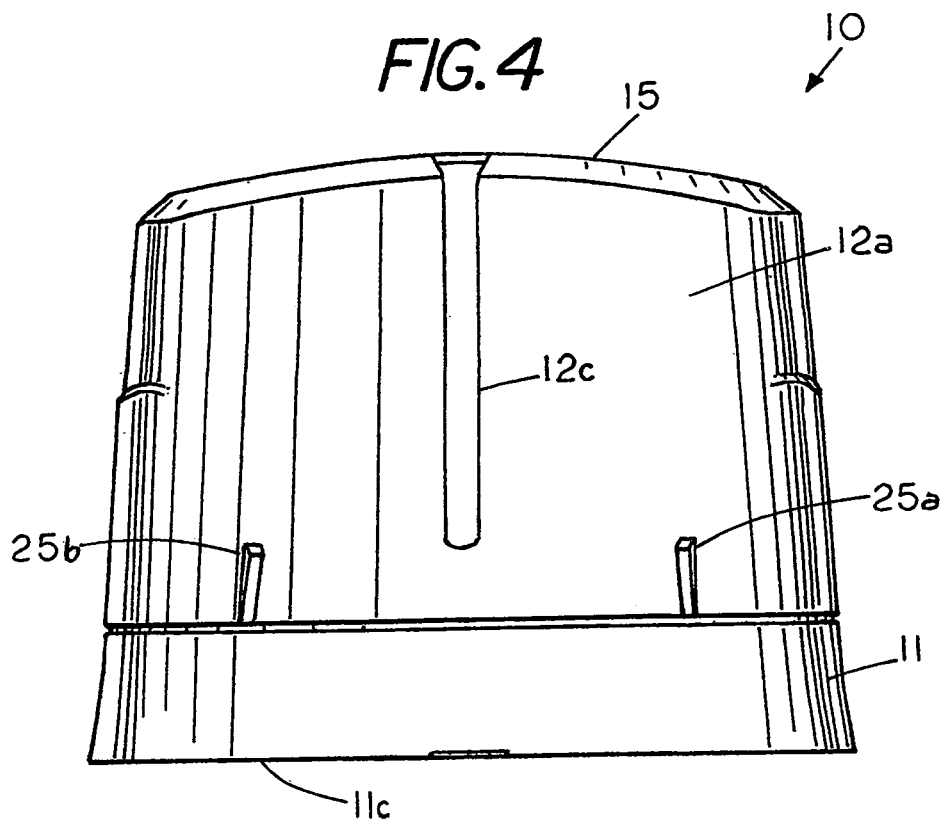

FILTERWELL CARTRIDGES

CROSS REFERENCE TO RELATED APPLICATIONS

This application claims priority from provisional application Ser. No. 62/919,523 filed Mar. 15, 2019 and is a continuation in part of U.S. patent application Ser. No. 16/059,977 filed Aug. 9, 2018, which claims priority from provisional application 62/544,173 filed Aug. 11, 2017 and provisional application 62/564,620 filed Sep. 28, 2017.

STATEMENT REGARDING FEDERALLY SPONSORED RESEARCH OR DEVELOPMENT

None

REFERENCE TO A MICROFICHE APPENDIX

None

BACKGROUND OF THE INVENTION

Dispensing cartridges are known in the art and are used to dispense sanitizing chemicals into bodies of waters such as pools and hot tubs through water contact with the dispersant within the dispensing cartridge. Typically, the dispensing cartridges have a chamber for holding a dispersant and a set of variable openings that permits ingress and egress of water into the chamber to bring the water into contact with the dispersant therein. Since water conditions affect how and when the dispersant is released from the dispensing cartridges there are a number of different types of dispensing cartridges that have evolved for delivery of a sanitizing dispersant into a body of water. An example of a free floating dispensing cartridge that gradually releases dispersant into a body of water as water seeps into the dispersant chamber in the dispensing cartridge is shown in U.S. Pat. No. 10,047,535. An example of a dispensing cartridge that is fitted and secured within a dispenser with water flowing through the dispersant containing chamber is shown in U.S. Pat. No. 9,314,747. An example of a dispensing cartridge system that dispenses two separate dispersants into the body of water as the dispensing cartridge system floats in a body of water is shown in U.S. Pat. No. 7,060,190. An example of a dispensing cartridge having diffusion ports that can be used in either a stagnate water environment or a moving fluid environment is shown in U.S. Pat. No. 9,714,129. An example of a dispensing cartridge where the release of dispersant is dependent on how far the dispensing cartridge is lowered into a stream of water flowing through a valve is shown in U.S. Pat. No. 4,270,565.

While the prior art reveals multiple types of dispensing cartridges for use in various bodies of water one of the more challenging locations for a dispensing cartridge is in the open top filterwell of a hot tub or spa where water flows from a main tub area, where persons sit, into a separate smaller water compartment containing a filter, with the smaller water compartment referred herein as a filterwell. The water then flows through a cartridge filter in the filterwell to remove debris from the water before returning the water to the main tub area.

While the location of a dispensing cartridge in the filterwell has the advantage of keeping the dispensing cartridge out of the main tub area of the hot tub or spa and into a region where water flows therethrough the filterwell dispensing cartridge needs to be able to reliably deliver dispersant into the water as the water flows through the filterwell without interfering with the filtering action within the filterwell. In addition since the flow of water through the filterwell, which is a small compartment where water flow patterns change as a result of change of the activity level in the hot tub, can cause a free floating filterwell cartridge to be tossed about in the filterwell. Such tossing action can affect the delivery rate of the cartridge as well as cause damage to cartridge filter in the filterwell and to the dispensing cartridge. For example, one should prevent the dispensing cartridge from hitting the walls of the filterwell due to the changing or swirling water flow patterns within the filterwell since either or both the dispensing cartridge or the walls of the filterwell could be damaged. In addition such violent action of the dispensing cartridge can generate unwanted noises and improper dispensing rates. Furthermore since the filterwell dispensing cartridges need to be periodically replaced the filterwell dispensing cartridges should be easily removable and easily replaceable within the filterwell.

While replacement of a dispensing cartridge is important it is also desirable to have dispensing cartridges located in the filterwell in a position where the amount of delivery of the dispersant into the filterwell can be changed on-the-go. Typically, changing the dispensing rate of dispersant needs to be convenient as well as easily accomplished by a person without any tools as changing the dispensing rate depends on an ongoing bacterial load in the hot tub. Various dispensers have been placed proximate the filterwell including a dispenser mounted on the gate to the filterwell and a dispenser mounted within the core of the cartridge filter in the filterwell as shown in U.S. Pat. No. 6,165,358. Neither of these devices allows a hot tub user to easily change the rate of dispersant therefrom.

SUMMARY OF THE INVENTION

Briefly, the invention comprises an underwater dispensing cartridge that is removably securable below a water line within the filterwell of a hot tub or spa with the underwater dispensing cartridge herein referred to as a filterwell cartridge that includes at least two open compound faces that can sandwichingly support the filterwell cartridge in a dispensing condition within the filterwell so as not to interfere with the filtering action of the water cartridge filter and at the same time reliably deliver the dispersants from the filterwell cartridge into the body of water. The filterwell cartridge having compound faces located on diametrical opposite sides with each of the compound faces engageable with faces of an open socket that is secured to structure within the filterwell to horizontally and vertically retain the filterwell cartridge in a static dispensing position without impeding water filtration through the filterwell while allowing the filterwell cartridge to dispense dispersants into the body of water in response to the water contact with the filterwell cartridge.

BRIEF DESCRIPTION OF THE DRAWINGS

FIG. 3 is a left side elevation view of the filterwell cartridge of FIG. 1 showing the base relief;

FIG. 4 is a backside elevation view of the filterwell cartridge of FIG. 1 showing the extensions for holding the filterwell cartridge with respect to a filter cartridge holder;

FIG. 10a is a bottom view of the dispensing cartridge of FIG. 10a.

DESCRIPTION OF THE PREFERRED EMBODIMENT

Figure 1:
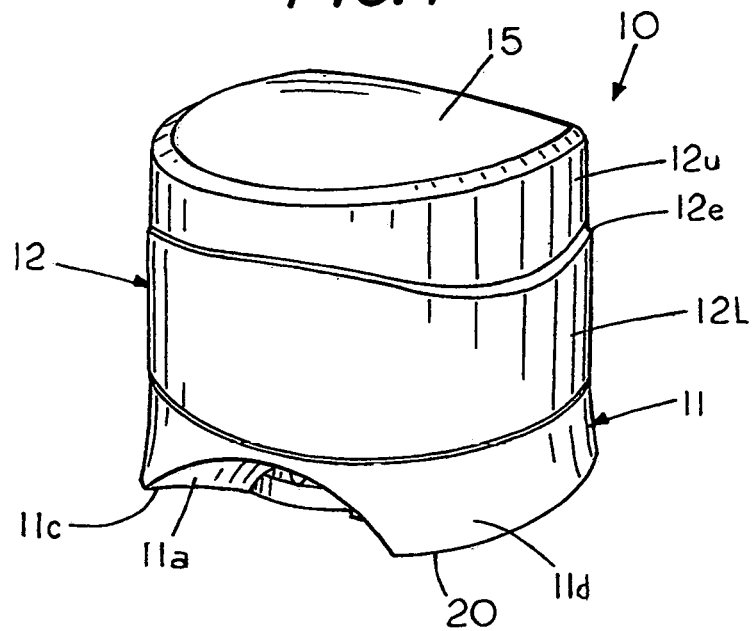
FIG. 1 is a perspective view of a filterwell cartridge
Figure 5:
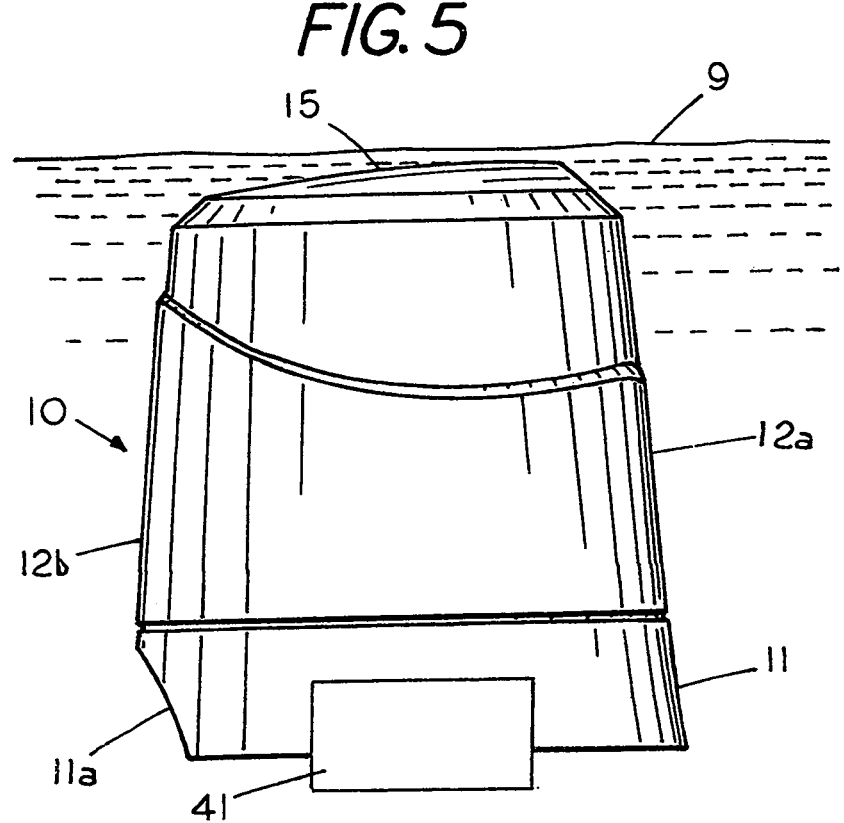
FIG. 5 is a right side elevation view of the filterwell cartridge of FIG. 1 located below a water line in a filterwell.
Figure 6:
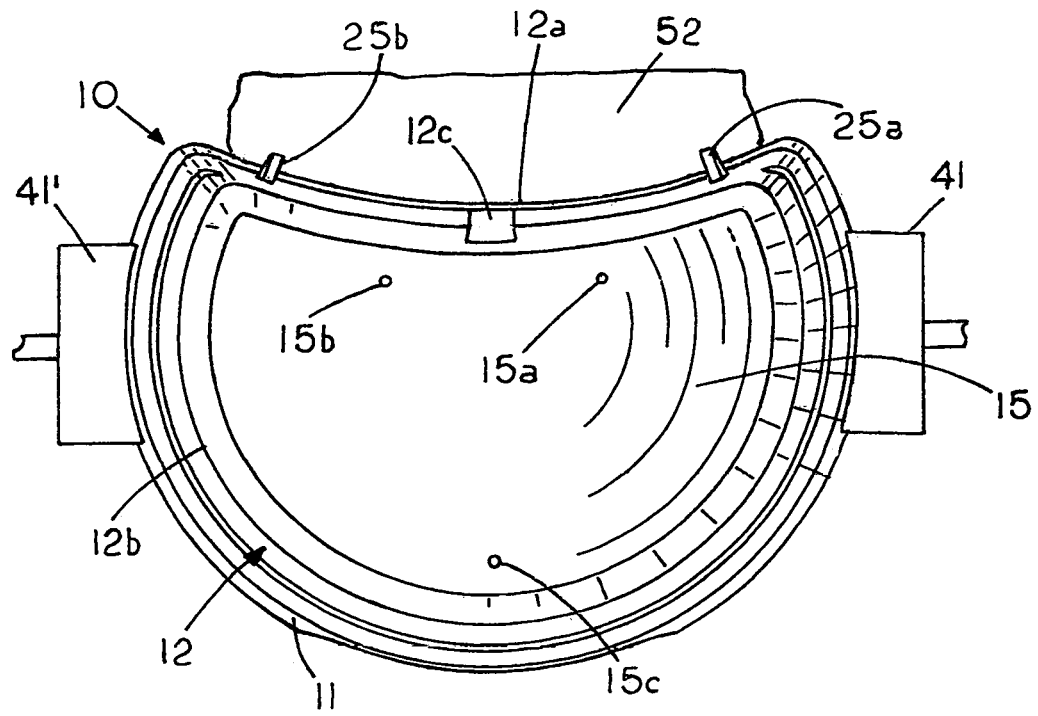
FIG. 6 is top view of the filterwell cartridge of FIG. 1 revealing the vent holes in the top face of the filterwell cartridge with the concave side of the filterwell cartridge proximate a cartridge holder located in a filterwell.

FIG. 1 is a perspective view of a filterwell cartridge 10 and FIG. 2, FIG. 3, FIG. 4 and FIG. 5 are elevation views of the filterwell cartridge 10 while FIG. 6 is a top view of the filterwell cartridge 10. FIG. 7, FIG. 8, FIG. 9 and FIG. 10, FIG. 10a are bottom views of the filterwell cartridge 10. A benefit of the filterwell cartridge describe herein is that the filterwell cartridge has features that allow the filterwell cartridge to be hand mountable and hand releasable from a cartridge holder, which remains affixed to structure within the filterwell of a hot tub.

Figure 2:
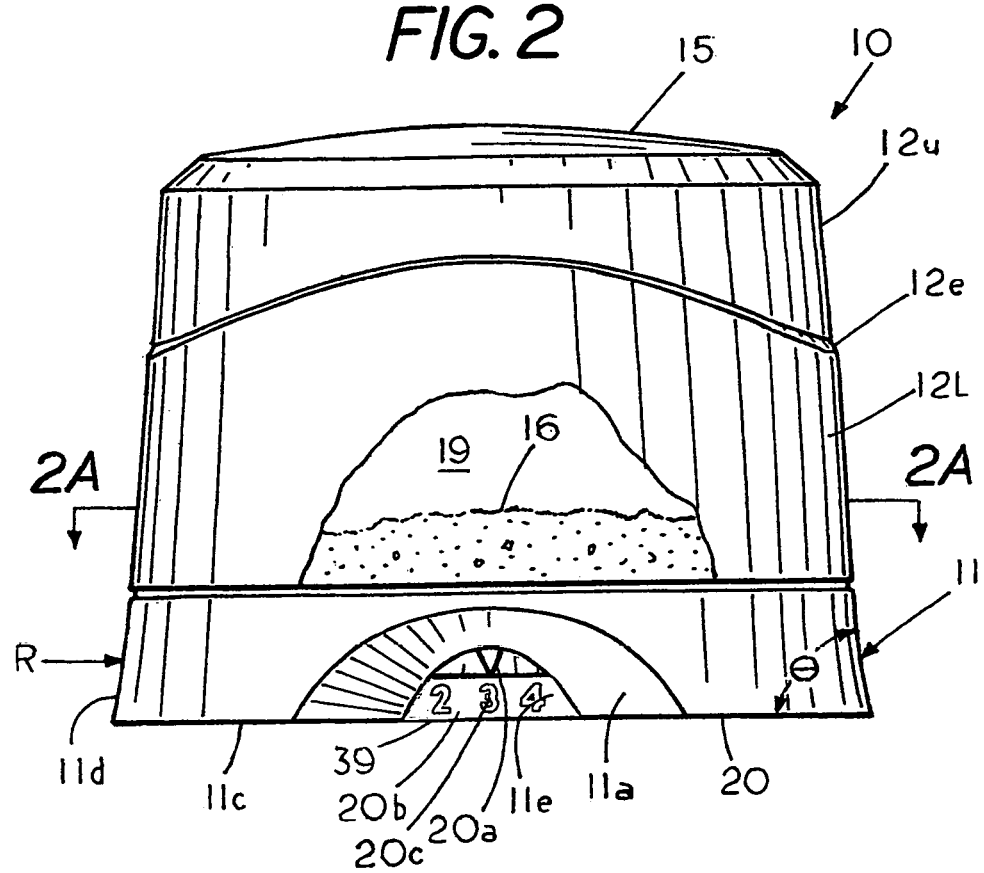
FIG. 2 is front side elevation view of the filterwell cartridge of FIG. 1 with a cutaway to reveal a chamber in the dispensing cartridge.

The filterwell cartridge as shown in FIG. 2 includes an enclosed a rigid housing 12 having a domed top 15, a convex frusto conical sidewall i.e. convex sidewall 12b forming a front face and a concave frusto conical sidewall 12a, (FIG. 6) that together with a base 20 form a dispersant or dispensing chamber 19 for holding a dispersant 16, such as a halogen or a mineral, in a dispensable condition therein when the filterwell cartridge 10 is supported in a dispensing condition within a filterwell of a spa or the like. In this example housing 12 includes an external upper face 12u that is visually separated from an external lower face 12L by a decorative undulating ledge 12e that may be used for ease in hand grasping the filterwell cartridge or for securing the filterwell cartridge to a cartridge holder.

Base 20 of filterwell cartridge 10 includes a circumferential rim 11 with a tapering or frusto conical front face i.e. an arcuate face 11d that forms an acute angle θ with a rim base face 11c as an example of a filterwell cartridge 10 that can be used to facially secure the filterwell cartridge to a cartridge holder, that is, the example in FIG. 2 shows the circumferential rim 11 has a radially outward flare with the bottom portion of the rim larger than a top portion of the rim. Also, in this example the filterwell cartridge 10 has a body that flares outward from the top of the filterwell cartridge to the bottom of the filterwell cartridge. Although the geometrical facial features shown are used to secure the filterwell cartridge to a cartridge holder other geometrical facial features of the filterwell cartridge may be used to removably secure the filterwell cartridge to a cartridge holder without departing from the spirit and scope of the invention.

FIG. 6 shows the domed top 15 of filterwell cartridge 10 including a first top vent hole 15a, a second top vent hole 15b and a third top vent hole 15c a. The vent holes 15a, 15b and 15c extend from the dispersant chamber 19 to a region outside the filterwell cartridge 10 for ingress and egress of water and or gas therethrough when the filterwell cartridge 10 is located below the water line in a hot tub or the like. In this example cartridge holder 41 and cartridge holder 41' form a removable handle for supporting the filterwell cartridge in a filterwell through face to face clamping engagement of the handle and portions of an exterior face of the filterwell cartridge 10.

Figure 7:
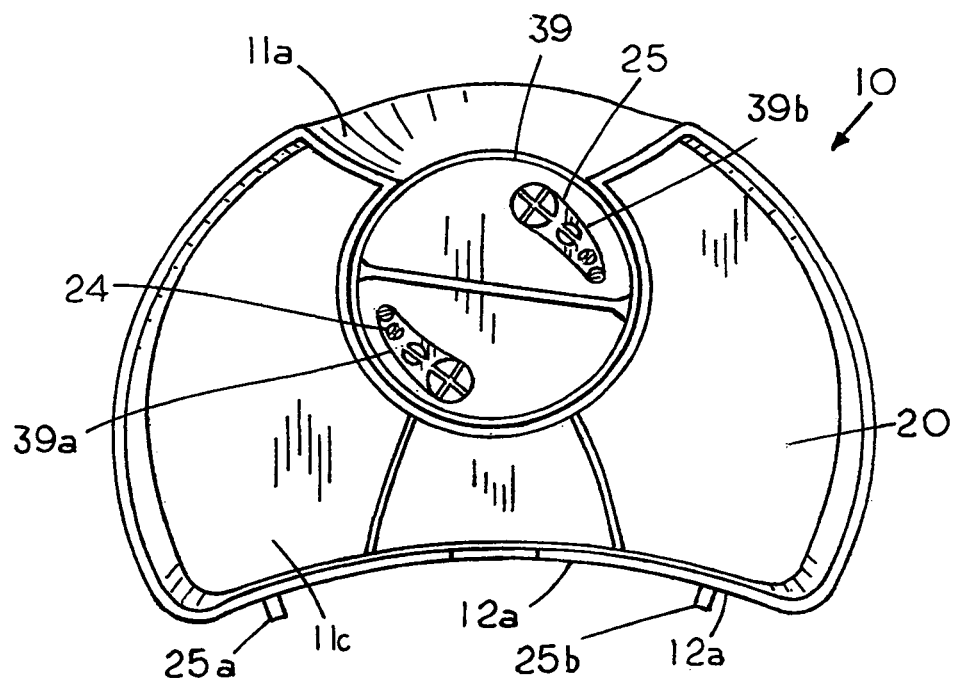
FIG. 7 is a bottom view of the filterwell cartridge of FIG. 1 with the base in an open or dispensing condition.
Figure 8:
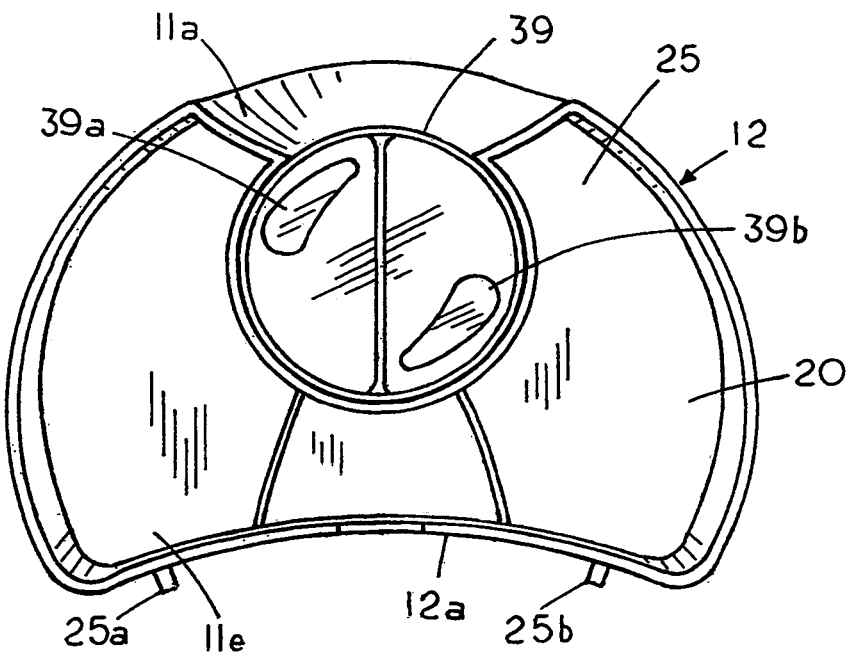
FIG. 8 is a bottom view of the filterwell cartridge of FIG. 1 in a closed or non-dispensing condition.

FIG. 3 is a left side elevation view of the filterwell cartridge 10, which in conjunction with FIG. 2 shows an arcuate relief face 11a in rim 11 that permits viewing access to a rotatable disk 39 that is rotational positionable in base 20 of filterwell cartridge 10 as shown in FIG. 7 and FIG. 8. A further feature of arcuate relief face 11a is that the angled arcuate sides of arcuate relief face 11a allow a user to see a numeric scale on a rotatable disk for adjusting a dispensing rate with the rotatable disk located on a bottom end of the filterwell cartridge. In this example the rotatable disk 39 includes a face 20b with a dispensing rate scale 20c to enable front viewing of the dispensing rate setting of the rotatable disk 39 when the filterwell cartridge is mounted in a cartridge holder by observing the position of pointer 20a on base 20 through an opening 11e in rim 11. To adjust the dispensing rate one can either make the adjustment while the filterwell cartridge is supported in a filterwell cartridge holder or one can remove the filterwell cartridge from a holder before making an adjustment. In either case a frontal view of the filterwell cartridge 10 allows one to readily view rotatable disk 39 and scale 20b to adjust the delivery rate of dispersant therefrom. This feature allows a user to adjust the rate of dispersant on-the-go by simply using arcuate relief face 11a to focus on the opening 11e as a user engages and rotates disk 39 to the proper setting. In the example shown the rotatable disk 39 is located opposite the concave rear face 12a, which is typically mounted against a face of a cartridge holder, to enable the rotatable disk 39 to be rotatably adjusted either with or without having remove the dispensing cartridge 10 from filterwell cartridge holder 52. An example of a filterwell cartridge holder is shown in our application Ser. No. 62/919,542 filed Mar. 15, 2019.

FIG. 7 and FIG. 8 show the rotatable disk 39, which is located in base 20 with the rotatable disk 39 having a first comma shaped opening 39a and a second comma shaped opening 39b although other shaped openings may be used. FIG. 7 shows disk 39 rotated in a first direction to an open condition to expose a first set of bottom ports 24 and a second set of bottom ports 25 each having openings therein to allow water access to the contents in filterwell cartridge 10. FIG. 8 shows the disk 39 rotated to a closed condition with disk 39 obstructing openings in bottom ports 24 and bottom ports 25 that were previously exposed to prevent flow of water into or out of a bottom end of filterwell cartridge 10.

Figure 9:
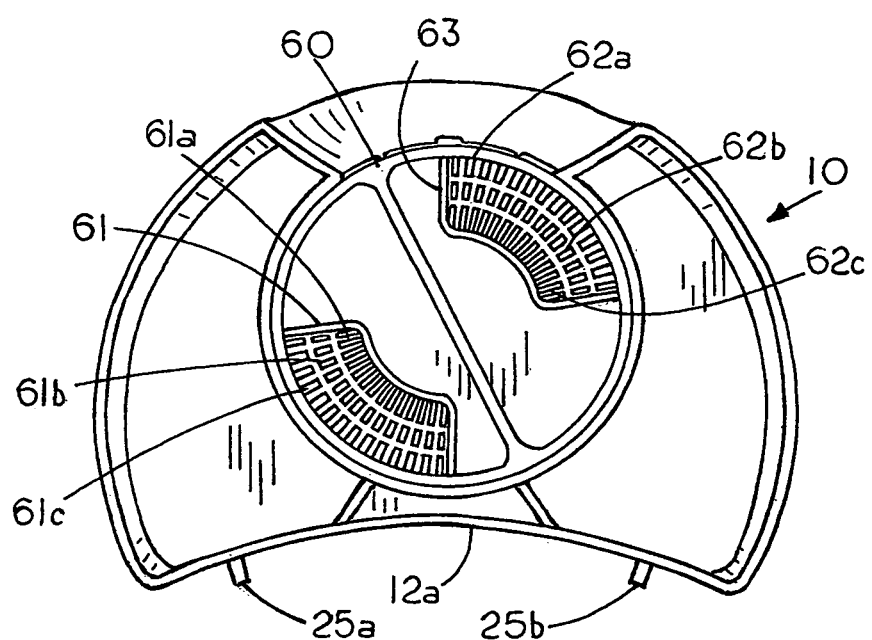
FIG. 9 is a bottom plan view of the filterwell cartridge with circumferential rows of radial ports that provide for graduated control of the open area in the bottom of the housing of the filterwell cartridge.

FIG. 9 shows an alternate embodiment of a rotatable disk 60 having an arc shaped opening 61 and an arc shaped opening 63 for controlling the ingress and egress of water into the chamber 19 in the filterwell cartridge 10. In this example the ports in the end of filterwell cartridge 10 comprise a first set of graduated rectangular shaped radial ports 61a, 61b and 61c and a second set of graduated rectangular shaped radial ports 62a, 62b and 62c that can be exposed or covered through rotation of disk 60. FIG. 9 shows disk 60 rotated to an open mode to permit water access to chamber 19 through the set of arc shaped openings 61a, 61b, 61c, 62a, 62b and 62c that are in alignment with the openings 61 and 63 in rotateable disk 60. Disk 60 may also be rotated to partially or completely cover the radial ports to vary the water access into the dispensing chamber 19. A feature of the rectangular shaped openings shown herein is that the graduated shapes of the arched rows of rectangular openings provide precise control of the flow area into and out of dispensing chamber 19 of the filterwell cartridge 10 through use of smaller increments of open area in the disk 60.

Figure 8A:
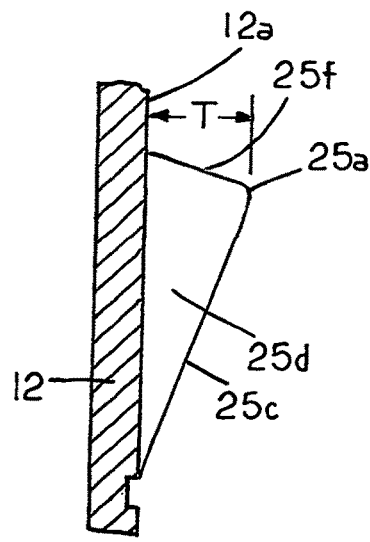
FIG. 8A is a sectional view of an extension on the filterwell cartridge.

FIG. 8 is a bottom view of filterwell cartridge 10 showing protrusions 25a and 25b extending therefrom and FIG. 8A is a sectional isolated view of housing 12 showing the protrusion 25a on filterwell cartridge housing 12. In this example protrusion 25a and protrusion 25b are identical although they could have different configurations without departing from the spirit and scope of the invention. Protrusion 25a extends perpendicularly outward from rear face 12a of cartridge housing 12 as does protrusion 25b. In this example protrusion 25a includes an angled top face 25f for engagement with a lip 52a on housing 53 of filterwell filterwell cartridge holder 52 (FIG. 8C) and a lower face 25c that angles inward with protrusion 25a having a width T, which in this example extends sufficiently far from housing 12 (indicated by distance T) so as to lockingly engage a portion of a filterwell cartridge holder together with the arcuate face 41 and arcuate face 41' to thereby restrain the filterwell cartridge housing 12 from accidental displacement therein. i.e. for example, a tilting or rotational displacement of the filterwell cartridge 10 within the filterwell cartridge holder 52. This feature is illustrated in FIG. 8C which shows the angled top face 25f of protrusion 12a fits under and engages the underside of a curved a lip 52a, which is part of filterwell cartridge holder 52 and an identical top face 25g of protrusion 12b fits under and engages a curved lip 52b, which is a part of filterwell cartridge holder 52.

Figure 8B:
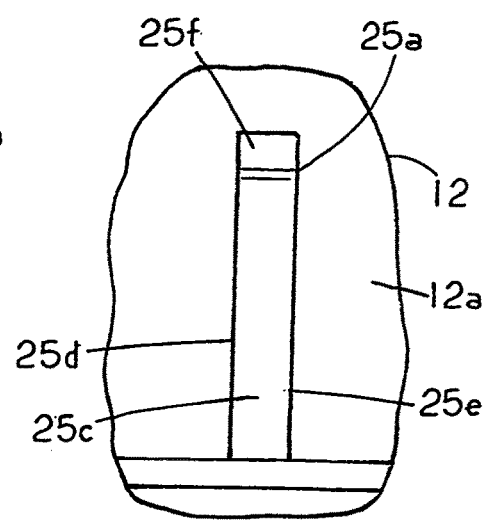
FIG. 8B is a frontal view of the extension of FIG. 8A.
Figure 8C:
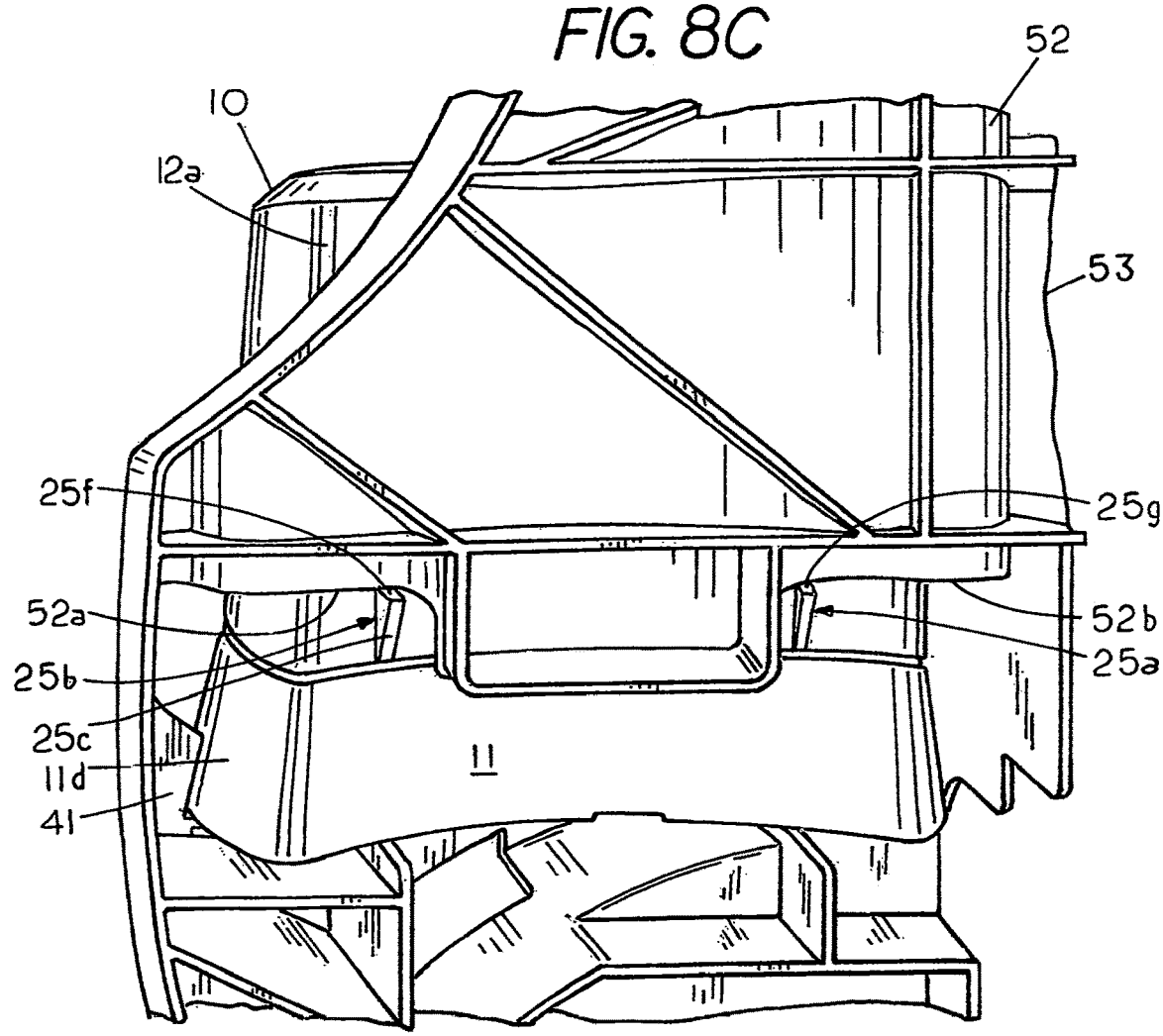
FIG. 8C is an isolated view of a portion of a cartridge holder mountable in a filterwell with a back face of a filterwell cartridge abutting the cartridge holder so that the openings in the filterwell cartridge and the cartridge holder coact to allow water access to a dispersant in the filterwell cartridge.

FIG. 8C also shows a further portion of filterwell cartridge holder 52 and an arcuate face 41 of the filterwell cartridge holder 52 in engagement with the circumferential ring 11 on the base of filterwell cartridge 10 and an arcuate face 11d in engagement with a further portion of the filterwell cartridge holder 52.

FIG. 8C is an isolated view of a portion of a filterwell cartridge holder 52 mountable in a filterwell with a back face 12a of a filterwell cartridge 10 abutting the filterwell cartridge holder 52 so that the bottom ports 73 and 74 in the filterwell cartridge 10 coact with the filterwell cartridge holder 52 to allow water access to a dispersant in the filterwell cartridge 10.

FIG. 8C further shows that in this example filterwell cartridge protrusions 25a and 25b engage filterwell cartridge holder 52 through extension of the protrusions 25a and 25b through an open portion of the housing 53 of filterwell cartridge holder 52. That is, in FIG. 8C the top angled stop surface 25f of protrusion 25a extends through an opening in the housing to engage a lip 52a in the filterwell cartridge holder 52 while the top angled stop surface 25g extends through a further opening the housing to engages a lip 52b in the filterwell cartridge holder 52 to restrain motion of the filterwell cartridge.

FIG. 8B is a frontal view of the extension or protrusion of FIG. 8A showing a first side face 25d and a second side face 25e that may be used to engage the housing of filterwell cartridge holder 52 to prevent or resist side-to-side or rotational displacement of the filterwell cartridge 10 within a filterwell cartridge holder 52. In this example extension 25a and extension 25b are identical, however, extension 25a and 25b may take other forms or geometrical shapes without departing from the spirit and scope of the invention.

Figure 10:
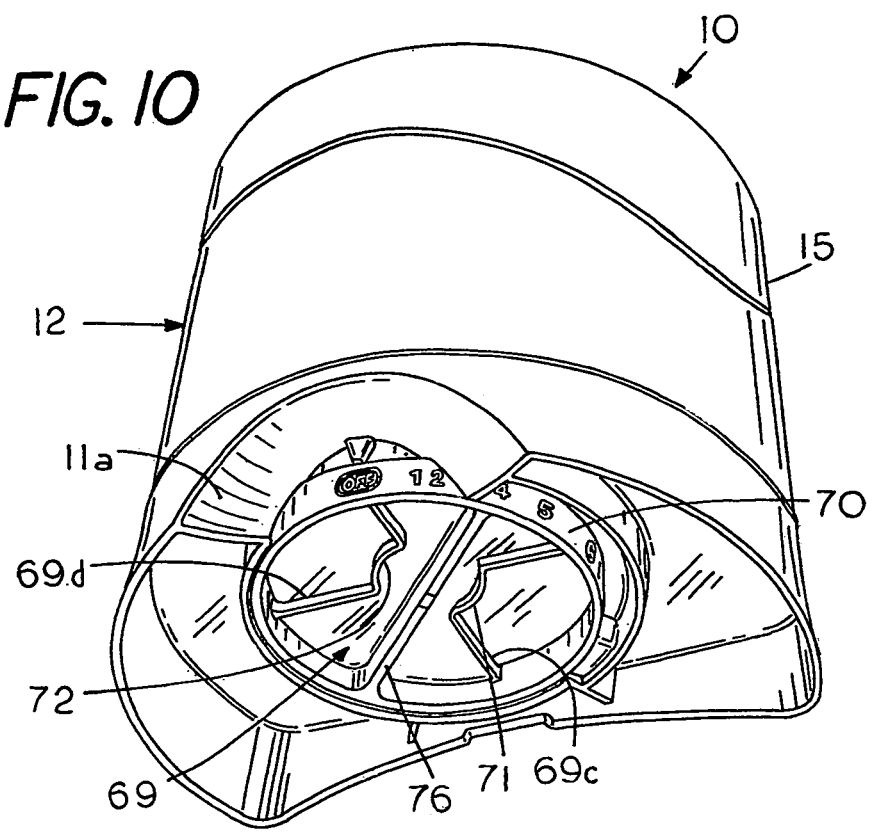
FIG. 10 is a perspective bottom view of a further dispensing cartridge.
Figure 10A:
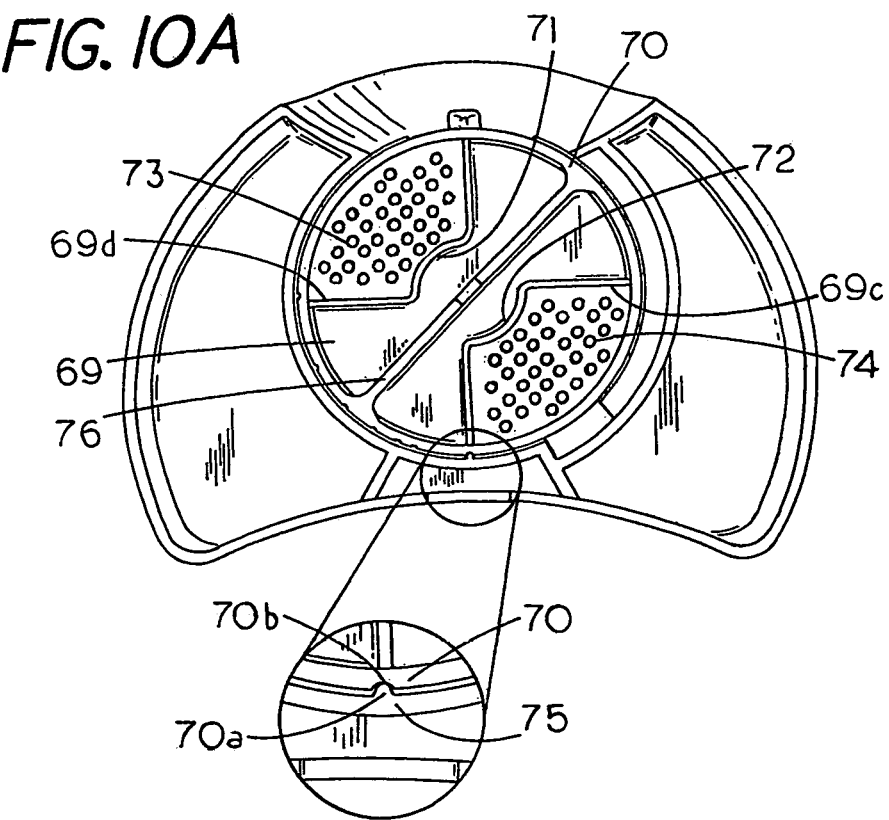

FIG. 10 and FIG. 10A show a bottom view of dispensing cartridge 10 with a different shaped rotatable disk 69 having a circular rim 70 with protrusions 70b spaced around rim 70 that engage detents 70a on rim 75, to hold the disk 69 in a rotated position. The detents 70a and protrusions 70b are such that the engagement of a detent and a protrusion provides resistant to rotation of disk and thus preventing an accidental change in the size of the open port area 73 and 74. However, a user can overcome the resistance and rotate disk 69 by applying a rotational force on web 76 to rotate disk 69 to the proper setting by placing a finger on one side of web 76 and a thumb on the opposite side of web 76. Lip 71 and lip 72 may be used as a location guide for placing one's finger and thumb on diametrical web 76. Note, in this example the open port area comprises circular openings 73 and 74 that are variable openings that are located in the bottom of the dispenser cartridge 10 and are visible in the segment shaped openings 69c and 69d in disk 69 that can be opened through rotation of disk 69. Similarly, rotation of disk 69 can also cover openings 73 and 74 and thus limit the open port area in the bottom of the dispenser cartridge 10. While circular openings are shown the size and shape of the openings as well as the number of openings can be used without departing from the spirit and scope of the invention. In some instance one may have a pattern of same size openings where some of the openings are blind and others extend through the disk 69 to provide a uniform pattern that enhances ones view of the disk.

FIG. 4 shows a back side of the filterwell cartridge 10 including a first protrusion or extension comprising a radial rib 25a and a second protrusion or extension comprising a radial rib 25b extending laterally outward from the concave rear face 12a for engaging a cartridge holder or the like. In some instances the protrusions may be used to prevent displacement of filterwell cartridge 10 within a cartridge holder. That is, the protrusions i.e. radial ribs 25a and 25b on rear face 12a can be used to lock the filterwell cartridge to a cartridge holder to maintain the filterwell cartridge 10 in a non rotational condition on a cartridge holder as water flows past or through the filterwell cartridge, which is located proximate a filter in the filterwell of a hot tub or spa. In addition to preventing rotation the ribs, when in engagement with the cartridge holder, can also prevent or resist tipping of the filterwell cartridge within the cartridge holder as illustrated in FIG. 8C.

While two ribs 25a and 25b are shown as radial protrusions for maintaining the filterwell cartridge in the cartridge holder more or less ribs or other types of protrusions for locking the filterwell cartridge to the holder could be used, for example the protrusion could be a post, a wall, a latch, a snap that can engage with a filterwell cartridge holder to support the filterwell cartridge therein without departing from the spirit and scope of the invention. In this example filterwell cartridge 12 includes an external channel 12*c* extending axially downward from the domed top 15 with the channel available for use when assembling filterwell cartridge 10. In the example shown the ribs 25*a* and 25*b* are located on a concave rear face 12*a* of the filterwell cartridge 10 for engagement with a filterwell cartridge holder 52 with the filterwell cartridge diverging toward the base formed by circumferential ring 11 then at the top of the filterwell cartridge for removably securing the filterwell cartridge 10 to cartridge holder arm 41 and cartridge holder 41' which includes a shelf surface 41*a* and a shelf surface 41*a'*. The ribs 25*a* and ribs 25*b* are dimensioned so that the ribs 25*a* and 25*b* are in tight engagement or frictional engagement filterwell cartridge holder 52 to assist in holding the dispensing cartridge 10 on carriage holder 41, 41' i.e. working engagement with each. Preferably, the engagement therebetween is such that ribs 25*a* and 25*b* snap into a holding position (see FIG. 8C) on the filterwell cartridge holder 52 as the rim face 11 simultaneously engages cartridge holder 41 and cartridge holder 41' to provide sensory assurance that is, through touch or an audible sound or both that the cartridge 10 is properly seated in a dispensing condition on the filterwell cartridge holder 52.

FIG. 5 is a right side elevation view of the filterwell cartridge of FIG. 1 and FIG. 6 showing filterwell cartridge 10 including a concave rear face 12*a* and a convex front face 12*b* with the front face 12*b* mating with the concave rear face 12*a* to create a downward diverging dispersant chamber 19 within filterwell cartridge 10. A water line 9 located above the domed top 15 shows that in this example the filterwell cartridge 10 is located in a dispensing position below the water line when supported therein by a first cartridge holder 41 and a second cartridge holder 41' (FIG. 6) located on the opposite sides of the filterwell cartridge 10.

As shown in FIG. 6 the top 15 of filterwell cartridge 10 has a first vent hole 15*a* a second vent 15*b*, and a third vent hole 15*c* for ingress and egress of air or water therethrough although more or less vents may be used. In this embodiment top 15 is seamlessly joined to the concave rear face 12*a* and the convex front face 12*b* to form an upper portion of the dispersant chamber 19 with the base 20 forming a bottom to the dispersant chamber 19 as shown in FIG. 2. In this example cartridge holder 41 and cartridge holder 41' are secured to structure (not shown) within the filterwell to hold the filterwell cartridge 10 in a dispensing condition.

FIG. 6 illustrates a further feature of filterwell cartridge 10 with the filterwell cartridge mountable proximate a filterwell cartridge holder 52 within the filterwell with extension or radial rib 25*a* and 25*b* on the filterwell cartridge 10 engageable with a filterwell cartridge holder 52 to hold the filterwell cartridge 10 and dispensing ports thereon in a dispensing condition within a filterwell.

A feature of the invention shown herein is that a user can quickly mount or remove the filterwell cartridge 10 from a cartridge holder, which may be located below the water line in a filterwell of a hot tub or the like, through pressure mating of surface features on the filterwell cartridge 10 to surface features on a cartridge holder with the respective mating surface features held in engagement with each other through radial pressure exerted through a cartridge holder that has lateral extensions located on opposite sides of the filterwell cartridge 10. The mating engagement therebetween preventing filterwell cartridge 10 displacement in each of three orthogonal axes with respect to a filterwell cartridge holder. The aforesaid mating engagement eliminating the need to mechanically fasten or latch the filterwell cartridge 10 to a cartridge holder even though the filterwell cartridge 10 is subject to irregular fluid forces that can toss the filterwell cartridge 10 about in the filterwell. For example, swirling flow or turbulent flow of water in the filterwell may introduce dynamic forces on the filterwell cartridge that can toss the filterwell cartridge about, which may upset the dispensing rate of the filterwell cartridge.

Figure 2A:
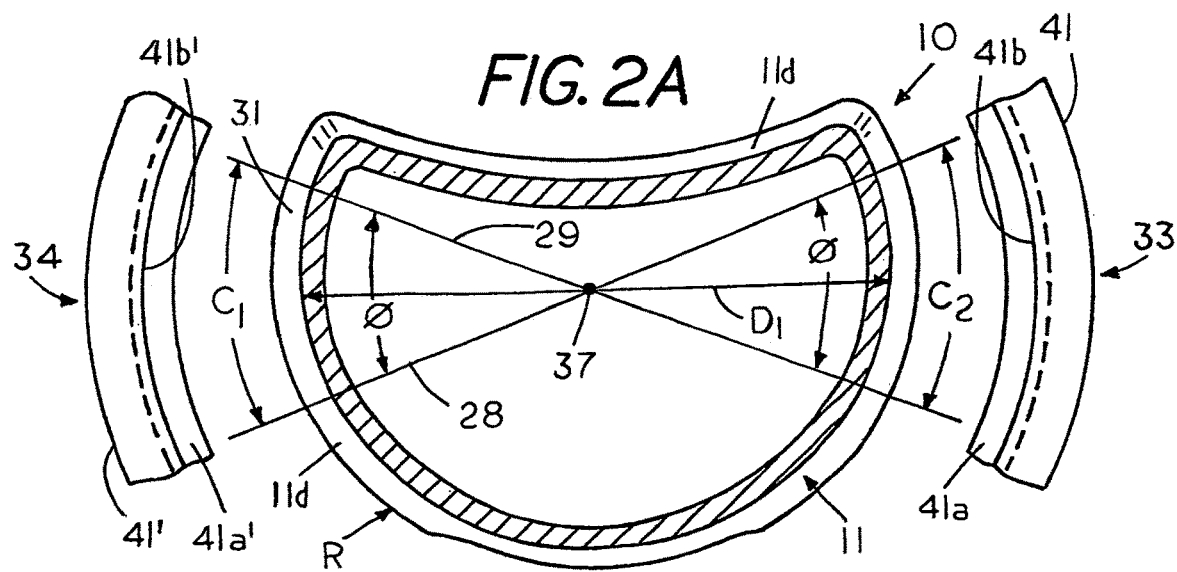
FIG. 2A is sectional view taken along lines 2A-2A of FIG. 2.

To appreciate the surface features on the filterwell cartridge 10 that enable a person to quickly remove or replace a filterwell cartridge 10, which is located in a filterwell of a hot tub or the like, reference should be made to FIG. 2A. FIG. 2A is a sectional view of filterwell cartridge 10 showing a rim face 11*d* on filterwell cartridge 10 in relation to a first open face cartridge holder 41 and a second open face cartridge holder 41', which may be part of a single cartridge holder that mounts to structure within the filterwell, for example to a cap or feed pipe on a water filter cartridge. A first arcuate face 41*a* and a second arcuate face 41*b* of cartridge holder 41 are located between a first diameter line 28 and a second diameter line 29 with $C_2$ identifying a first circumferential region of filterwell cartridge between the right end of the diameter line 28 and the right end of diameter line 29 by an arc angles Ø between the diameter lines 28 and 29. Similarly, $C_1$ identifies a second circumferential region or face on filterwell cartridge 10 that extends between diameter line 28 and diameter line 29 also identified by an arc angle Ø between the diameter lines 28 and 29 with this example showing the arc angle Ø less than 90 degrees.

In this example $C_1$ and $C_2$ contain opposite convex, arcuate faces with the arcuate face $C_1$ are engageable with a resilient socket 34 formed by shelf face 41*a'* and side face 41*b'* and the arcuate face $C_2$ engageable with a resilient socket formed by shelf face 41*a* and arcuate face 41*b* to hold the filterwell cartridge 10 in a fixed dispensing condition within a hot tub filterwell through open face to face arcuate engagement therebetween. The arcuate face $C_1$ and $C_2$ are shown as continuous, however, the faces may contain multiple segments for engagement with a filterwell cartridge.

Figure 2B:
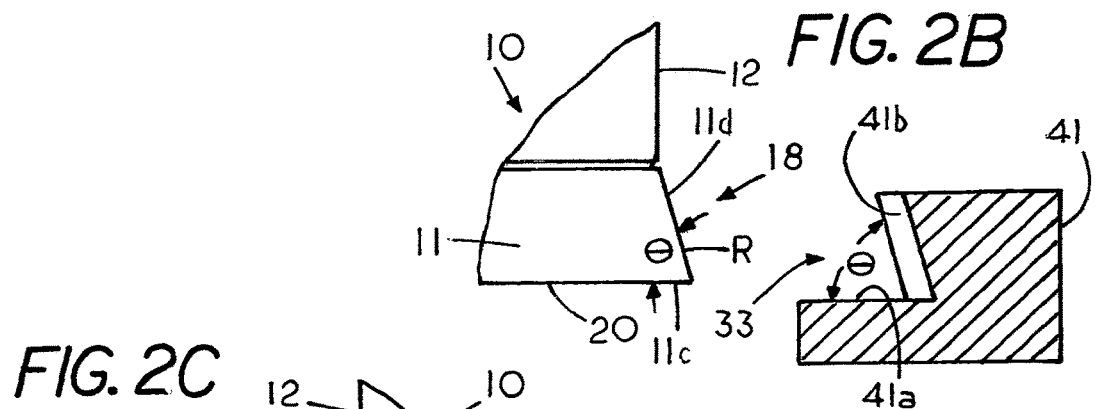
FIG. 2B is an isolated view showing rim position of a filterwell cartridge with respect to a jaw or socket of a cartridge holder.
Figure 2C:
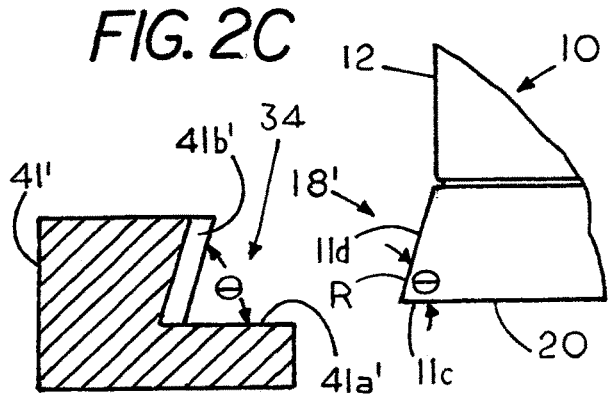
FIG. 2C is an isolated view showing rim position of a filterwell cartridge with respect to a further jaw or socket of a cartridge holder.
Figure 2D:
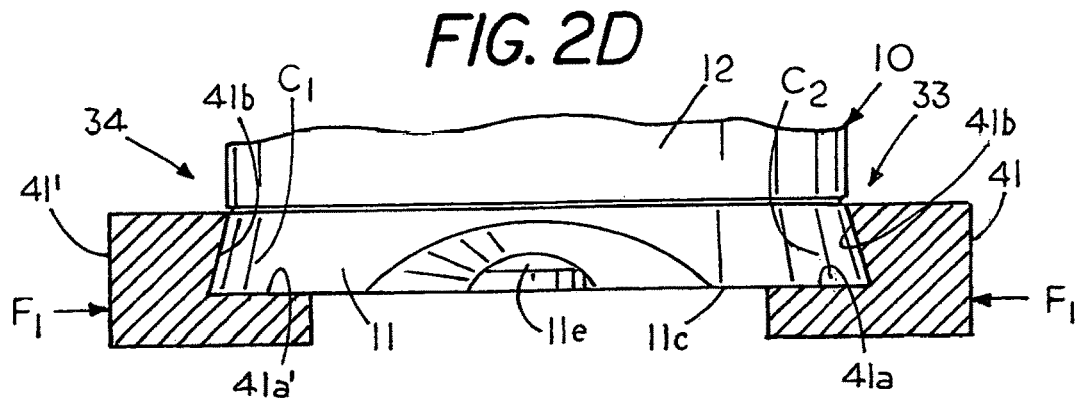
FIG. 2D is an isolated view showing simultaneously rim engagement of the filterwell cartridge with opposing jaws of a cartridge holder.

FIG. 2B; FIG. 2C and FIG. 2D show the arcuate side face 11*d* and a flat rim base face 11*c* on the filterwell cartridge 10. FIG. 2D shows the filterwell cartridge 10 cantileverly engaged in a face-to-face condition with a socket 33 in first cartridge holder 41 and a socket 34 in second cartridge holder 41'. The cantilever engagement supports the filterwell cartridge housing 12 in a stable dispensing condition within the swirling waters of a filterwell as well as resists orthogonal displacement i.e. 3 axis lateral displacement of the filterwell cartridge housing 12 with respect to the cartridge holder 41 and cartridge holder 41'.

FIG. 2B is an isolated, partly sectional view of a portion of housing 12 and rim 11 revealing a first circumferential toe 18, which is part of rim 11, with toe 18 having an open compound face or arcuate face 11*d* that is located an acute angle θ to the face 11*c* for engagement with a socket 33 in cartridge holder 41. FIG. 2C is also an isolated, partial sectional view of a cartridge holder 41' having a flat face or base 41*a'* and an arcuate face 41*b'* located at an acute angle θ to flat face or base 41*a'* to form a socket 34. An acute angle of the arcuate face 11*d* to face 11*c* ensures that when the arcuate face 11*d* and face 11*c* are in face to face contact with the cartridges holders 41 and 41' the overhang of the cartridge holder arcuate face 41b and 41b' produced by the arcuate face 41b and 41b' being at an acute angle resists lifting the filterwell cartridge 10 out of the cartridge holders 41 and 41'. The acute angle θ may be selected on the tolerances one wants to maintain between cartridge holder and the housing. For example, an acute angle of about 82 degrees may be sufficient to hold the cartridge holders and the housing in engagement with each other for one set of dimensional tolerances while in other cases the dimensional tolerances may require the acute angle to be more or less than 80 degrees. In this example the compound face described herein are open faces and have at least two surfaces with one of the surfaces arcuate and the other a plane surface. Other types of compound faces where the faces may have other shapes and are not in the same plane may also be used for mating engagement between a filterwell cartridge housing and a cartridge holder to support a filterwell cartridge therein though pressure engagement between opposed compound faces on the cartridge holder and the filterwell cartridge.

Similarly, FIG. 2C is an isolated, sectional view of a portion of housing 12 and rim 11 revealing a first circumferential toe 18' with toe 18' having a compound or arcuate face 11d that is located an acute angle θ to the flat rim base face 11c. FIG. 2C is also an isolated, partial sectional view of a cartridge holder 41' having a flat arcuate base 41a' and an arcuate face 41b' located at an acute angle to flat base 41a'.

FIG. 2D reveals the sandwichingly support of the filterwell dispenser housing 12 through face to face engagement between the open faces of the rim 11 and filterwell cartridge housing 12 and the open faces of cartridge holder 41 and cartridge holder 41' to prevent or resist lateral or vertical displacement of the filterwell cartridge 10 through compound face engagement of at least two faces of the filterwell cartridge 10 through force $F_1$ on cartridge holder 41 and force $F_1$ on cartridge holder 41'. Thus, FIG. 2D shows the filterwell cartridge 10 facially mounted to filterwell cartridge holders 41 and 41' without needing to latch or fasten the filterwell cartridge to the cartridge holder since the filterwell cartridge housing is restrained from motion in three mutually perpendicular axis through the open face to face contact between rim 11 and cartridge holders 41 and 41'.

In this example arcuate section $C_1$ and arcuate section $C_2$ each have the same radius of curvature R to enable face to face mating engagement between a cartridge holder 41 located on one side of filterwell cartridge 10 and a cartridge holder 41' located on the opposite side of filterwell cartridge 10.

FIG. 2A and FIG. 2D show that arcuate face $C_1$ and $C_2$ are located on the diametrical opposite side of filterwell cartridge 10 so that arcuate cartridge holder face 41b and cartridge holder face 41a form a first socket 33 and arcuate cartridge holder face 41b' and cartridge holder face 41a' form a second socket 34 that are in simultaneous contact engagement with rim 11 of the filterwell cartridge 10 to prevent or resist lateral or horizontal movement of the filterwell cartridge 10 with respect to the cartridge holder 41 or cartridge holder 41'. Thus, cartridge holder engagement with diametrical opposed arcuate faces $C_1$ and $C_2$ on filterwell cartridge 10 provides three dimensional securement of the filterwell cartridge 10 to the cartridge holders 41 and 41' through cantileverly engagement without the need to penetrate the exterior faces of the filterwell cartridge in order to retain the filterwell cartridge on cartridge holders 41 and 41'.

As described and shown herein the filterwell cartridge 10 includes a first open compound face 18 where surfaces of the first open compound face are such that they extend in three orthogonal directions to provide a filterwell cartridge region that can be mated to a holder having complimentary opposite faces to postionally restrain the dispensing cartridge in orthogonal directions. The filterwell cartridge including a second open compound face 18' where surfaces of the second open compound face are such that they also extend in three orthogonal directions to provide a further filterwell cartridge region that can be mated to the holder having further complimentary opposite faces. A feature of housing securement through open compound faces is that it eliminates the need for latches or other mechanical attachments to hold the filterwell cartridge in a stable dispensing position within the swirling waters in a filterwell thereby providing quick release of the filterwell cartridge through release of the compressive forces on opposite sides of the filterwell cartridge or conversely providing quick attachment through applying a compressive force to opposite sides of the filterwell cartridges. As shown herein the mating of the open compound faces of a filterwell cartridges with the mating or complimentary opposite faces of a cartridge holder coact to maintain filterwell cartridge 10 in a stable dispensing condition within the swirling waters found in a filterwell. That is, the filterwell cartridge 10 contains facial features that are peripherally supportable in a quick attachment mode solely through facial engagement of compound surfaces on opposite sides of the filterwell cartridge. Conversely, the filterwell cartridge is also supported in a quick relapse mode through facial disengagement of compound surfaces on the filterwell cartridge.

The method further includes controllably delivering a dispersant to water within a filterwell by placing a quick attach and quick release filterwell cartridge having a housing with a vented chamber having a dispersant therein into the filterwell through resiliently and compressively engaging a first compound face on the housing with a first cartridge holder and resiliently and compressively engaging a second compound face on the housing with a second cartridge holder with the compressively engaged faces of the filterwell cartridge supporting the filterwell cartridge in a dispensing condition proximate a water filter located within the filterwell.

We claim:

1. A filterwell cartridge comprising:
    a housing having a dispersant chamber therein with said housing including at least one vent extending from the dispersant chamber within the filterwell cartridge to a region outside said filterwell cartridge;
    a base located on said housing with said base having a rim with the rim having a first arcuate face $C_1$ and a second arcuate face $C_2$ with the first arcuate face forming a first compound face and the second arcuate face forming a second compound face with the first compound face located diametrically opposite the second compound face; and
    a rim base face on said housing with the first arcuate face $C_1$ and the second arcuate face $C_2$ located at an angle with respect to the rim base face so that engagement of the first compound face and the second compound face with a filterwell cartridge holder resists displacement of the filterwell cartridge with respect to the filterwell cartridge holder.

2. The filterwell cartridge of claim 1 wherein the first arcuate face and the second arcuate face extend over an angle Ø of less than 90 degrees.

3. The filterwell cartridge of claim 1 wherein a portion of the housing has a convex frusto conical sidewall and a further portion of the housing has a concave frusto conical sidewall with the convex frusto conical sidewall and the frusto convex sidewall joined to each other to form a sidewall of the filterwell cartridge.

4. The filterwell cartridge of claim 1 wherein the first arcuate face and the second arcuate face have the same radius of curvature.

5. The filterwell cartridge of claim 1 wherein the rim base face of the filterwell cartridge includes a flat face for vertical support of the filterwell cartridge and the housing includes at least one protrusion en to inhibit rotational displacement of the filterwell cartridge when the filterwell cartridge is located in filterwell cartridge holder.

6. The filterwell cartridge of claim 1 wherein the first compound face and the second compound face are located at an end of the filterwell cartridge so that a radial inward force on each compound face can restrain the filterwell cartridge from displacement through an end.

7. The filterwell cartridge of claim 6 including a removable handle having a first arcuate face in mateable engagement the first compound face and a second arcuate face in mateable engagement with the second compound face with the removable handle securable to the filterwell cartridge through face to face engagement therewith.

8. The filterwell cartridge of claim 1 including a rotatable disk mounted in an end of the housing with the disk rotatable to expose openings in the end of the housing.

9. The filterwell cartridge of claim 1 wherein the angle is an acute angle θ less than about 82 degrees.

10. The filterwell cartridge of claim 1 including a set of ribs located on a concave rear face of the filterwell cartridge with the set of ribs engageable with the filterwell cartridge holder and the housing is larger at the base then at a top of the filterwell cartridge to allow a dispensable material therein to fall toward the base of the filterwell cartridge.

11. The filterwell cartridge of claim 10 with the housing comprising a rigid housing wherein the set of ribs is engageable with the filterwell cartridge holder to resist rotation or tipping of said filterwell cartridge in said filterwell cartridge holder as said filterwell cartridge dispenses a dispersant into a filterwell.

12. The filterwell cartridge of claim 10 with the housing having a top with a vent therein and a circumferential rim to clampingly maintain the filterwell cartridge below a water line in a filterwell as the filterwell cartridge dispenses a dispersant therefrom.

13. The filterwell cartridge of claim 1 including a rotatable disk for adjusting a dispensing rate with the rotatable disk located on a bottom end of the filterwell cartridge with the rotatable disk having a face viewable from a front of the filterwell cartridge to enable viewing of the dispensing rate when the filterwell cartridge is mounted in a cartridge holder.

14. The filterwell cartridge of claim 1 including a scale on a rotatable disk with the scale viewable from a front face of the filterwell cartridge.

15. A filterwell cartridge positionable below a water line in a filterwell with the filterwell cartridge comprising:

a rigid housing having a dispersant chamber therein;

a vent in said housing;

a base located in said rigid housing with said base having a first compound face and a second compound face each having a portion containing an acutely angled face for positionally maintaining the filterwell cartridge below a water line in a filterwell through lateral engagement of the first compound face and the second compound face with a dispensing cartridge holder;

a set of ribs for engagement with the dispensing cartridge holder;

and a set of openings located in said base to control water flow into or out of the dispersant chamber in the housing.

16. The filterwell cartridge of claim 15 wherein said base includes an arcuately beveled relief face to focus a person onto a numeric face on a rotatable disk during adjustment of the rate of dispersant from said filterwell cartridge.

17. The filterwell cartridge of claim 15 with the housing includes a convex front face and a concave rear face with said base located at an end of the filterwell cartridge with said base compressively engageable on the convex front face to support the filterwell cartridge through face-to-face engagement with a filterwell cartridge holder.

18. A method of controllably delivering a dispersant to water within a filterwell comprising:

placing a filterwell cartridge housing having a vented chamber with a dispersant therein into the filterwell;

engaging a first arcuate face on the housing with a filterwell cartridge holder; and engaging a second arcuate face on the housing with the filterwell cartridge holder to support the filterwell cartridge in a dispensing condition proximate a water filter located within the filterwell.

19. The method of claim 18 including snapping at least two filterwell cartridges onto the filterwell cartridge holder with one of the filterwell cartridges containing a halogen and the other containing a mineral.

20. The method of claim 18 including securing the filterwell cartridge through face-to-face engagement with the first filterwell cartridge holder and a second cartridge holder.

21. The method of claim 18 including securing the filterwell cartridge within the filterwell through open face engagement of an acutely angled surface on diagonally opposite sides of the filterwell cartridge.

22. The method of claim 18 including engaging a protrusion on a face of the filterwell cartridge with a housing on a filterwell cartridge holder.

23. The method of claim 18 including maintaining a set of dispensing ports of the filterwell cartridge below a water line in the filterwell.

* * * * *